(12) United States Patent
Fackler et al.

(10) Patent No.: US 8,112,202 B2
(45) Date of Patent: Feb. 7, 2012

(54) AUTOMATIC CONTROL OF A LARGE BALE LOADING APPARATUS

(75) Inventors: Robert L. Fackler, Ephrata, PA (US); Donald R. Whitenight, Benton, PA (US)

(73) Assignee: CNH America LLC, New Holland, PA (US)

( * ) Notice: Subject to any disclaimer, the term of this patent is extended or adjusted under 35 U.S.C. 154(b) by 436 days.

(21) Appl. No.: 12/469,748

(22) Filed: May 21, 2009

(65) Prior Publication Data

US 2010/0299029 A1 Nov. 25, 2010

(51) Int. Cl.
*B60P 1/50* (2006.01)
(52) U.S. Cl. ................. 701/50; 56/474; 56/475
(58) Field of Classification Search .......... 701/50; 56/341, 344, 350, 474, 475; 414/24.5, 698, 414/699, 701, 730
See application file for complete search history.

(56) References Cited

U.S. PATENT DOCUMENTS

| | | | |
|---|---|---|---|
| 3,139,196 A | 6/1964 | Legocki | |
| 3,877,595 A | 4/1975 | Edelman | |
| 3,951,271 A | 4/1976 | Mette | |
| 4,119,212 A | 10/1978 | Flemmi | |
| 4,155,473 A | 5/1979 | Holopainen | |
| 4,396,215 A | 8/1983 | McCutcheon | |
| 4,397,495 A | 8/1983 | Lewis | |
| 4,408,942 A | 10/1983 | Butler et al. | |
| 4,606,696 A | 8/1986 | Slocum | |
| 4,844,675 A | 7/1989 | Strosser et al. | |
| 4,952,111 A | 8/1990 | Callahan | |
| 4,961,679 A | 10/1990 | Van Eecke et al. | |
| 5,829,238 A | 11/1998 | Branson | |
| 5,851,100 A | 12/1998 | Brandt | |
| 6,048,160 A | 4/2000 | Reist et al. | |
| 6,220,811 B1 | 4/2001 | Bernecker | |
| 6,997,663 B2 | 2/2006 | Siebenga | |
| 7,085,625 B2 * | 8/2006 | Timothy et al. | ............... 700/275 |
| 7,419,345 B2 | 9/2008 | Priepke | |

* cited by examiner

*Primary Examiner* — Joanne Silbermann
*Assistant Examiner* — Michael Stabley
(74) *Attorney, Agent, or Firm* — Patrick M. Sheldrake

(57) ABSTRACT

A control system for managing rotation of a bale loading arm in a bale loader in which a pair of sensors combined with a purposefully designed sensor target enable loading arm position to be efficiently derived by a controller in order to direct the actuator movements based upon loading arm position necessary for automated operation of a bale loading cycle. Additional inputs to the controller enable initiation of a bale loading cycle to be automatically initiated. The controller may also determine when a complete bale wagon load is achieved and automatically direct loading arm motions necessary to configure the bale wagon for transport.

16 Claims, 4 Drawing Sheets

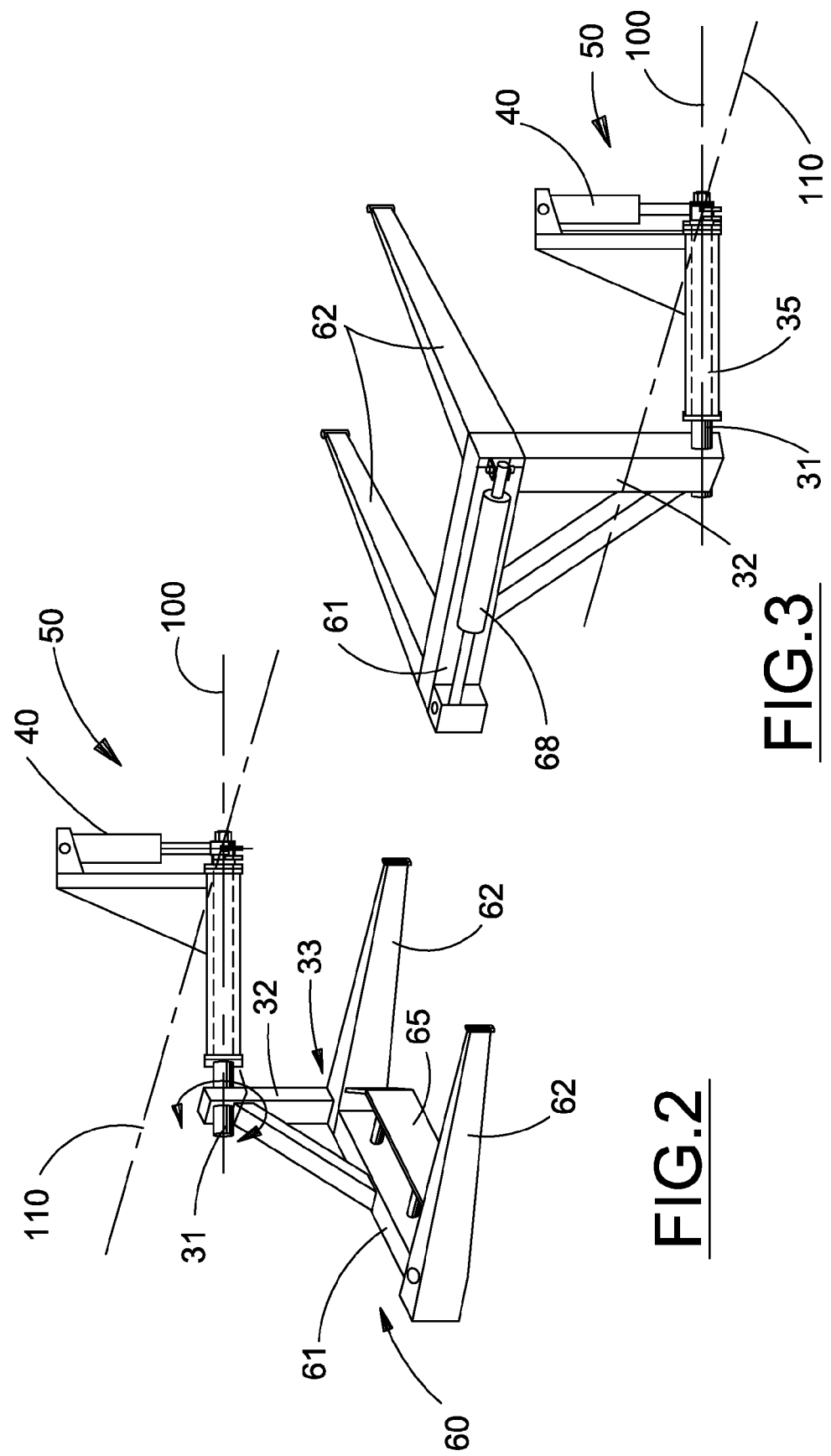

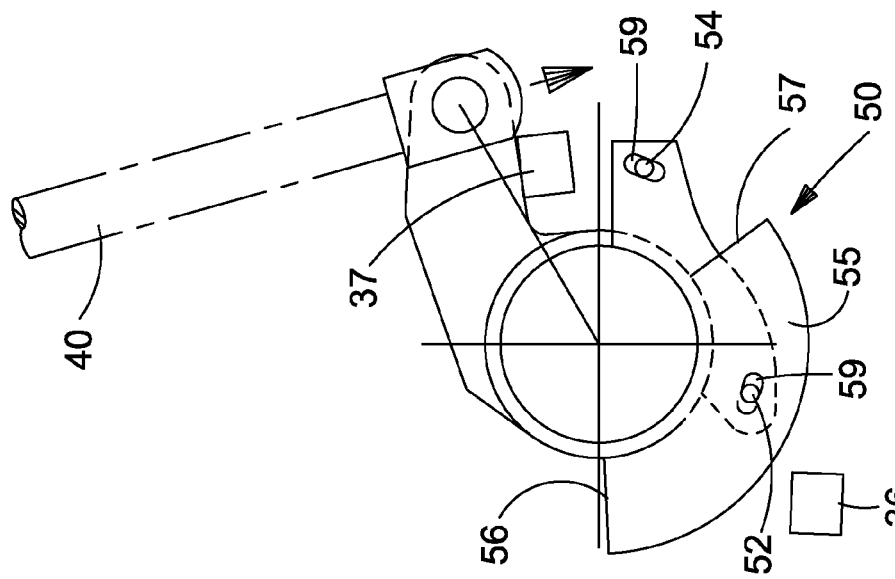
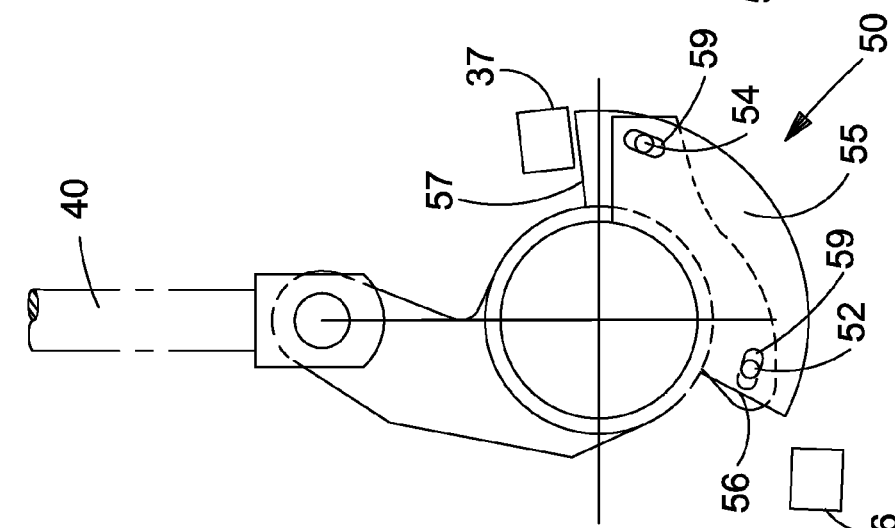
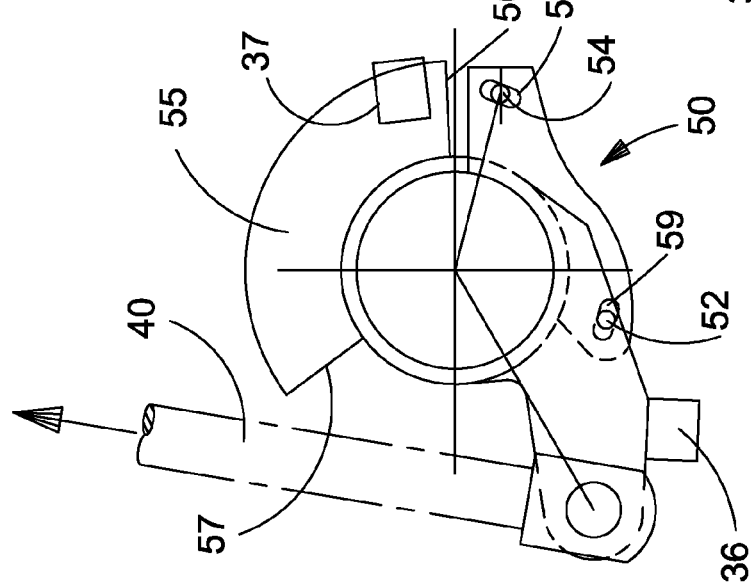

AUTOMATIC CONTROL OF A LARGE BALE LOADING APPARATUS

BACKGROUND OF THE INVENTION

The present invention relates generally to agricultural bale handling and hauling machines, and more particularly to such a control system for a bale wagon that automates the loading of large bales onto a bale wagon.

A large proportion of the resources and time of the agricultural industry is directed toward the production of feed for animals, and most specifically to the production of baled stem and leaf crops such as hay. The conventional process is to cut and condition the crop with a windrower, deposit it on the ground to dry, bale the crop when appropriately dry, and then position the bales in stacks for storage or transportation. High labor requirements and increasing costs of manual handling of bales have caused a growing number of commercial growers to abandon their small square bale operation for a large bale package, such as round bales, or large rectangular bales 3'×3', 3'×4', or 4'×4' in cross-section. Due to the large size of the bales, there is a need for equipment which can pick up the bales in the field, accumulate a load of bales, and transport them to a remote storage area where the accumulated bales can be unloaded. Also, such equipment must be flexible in the ability to deal with bales of varying sizes. Furthermore, it is important that the bale handling equipment be able to arrange and control the position of bales on the transporter bed after the bales have been picked up.

Commercial haulers prefer large square bales over small square bales because they can be retrieved from a field and loaded for a cross-country trip in less than an hour. Large rectangular bales are loaded onto flat-bed trucks or semi-trailers directly in the field at about 20 tons per man-hour. Transporting larger loads of bales reduces fuel usage and the time required for bale handling. It is these large rectangular bales that have become increasingly popular over the last several years, and to which this invention is most concerned.

The Mil-Stak® big bale loading attachment was developed as a way incorporate big bale handling capability on self-propelled or pull-behind bale wagons. The Mil-Stak® big bale loading attachment comprises a bale clamping apparatus connected to a pivoting lifting arm. The lifting arm is coupled at one end to the bale wagon for pivotal motion about a single axis, the axis being angled relative to the bale wagon. Loader arm movement is accomplished by a single actuator acting on a lever arm to pivot the lifting arm through approximately 180 degrees of motion. A second actuator actuates the clamping apparatus. The actuators are manually controlled by an operator from the cab of the bale wagon from where he can observe the bale position and manage actuator motions accordingly.

The Mil-Stak® bale loading attachment was developed as a retrofit solution for a bale wagon enabling big bales to be efficiently gathered from the field and loaded onto the bale wagon. The Mil-Stak® loading attachment replaces the bale loading normally supplied with a bale wagon and allows big bales to be loaded onto the bale wagon. The replacement also renders certain bale handling operations necessary for small bale loading unnecessary, so the bale wagon must be operated in a manual mode when using the Mil-Stak® attachment. The Mil-Stak® attachment requires and offers minimal controls accessible to the operator through a small electromechanical operator interface requiring manual operator input for all loader movements. Manual control introduces difficulty in that the single hydraulic actuator used to reposition the bale loader arm requires reversing the direction of the actuator as the loader arm reaches an apogee in the pivotal motion. The operator must, therefore, precisely actuate a switch which causes the actuator to reverse its direction of movement at the loader arm apogee, allowing momentum to move the loader arm through the apogee position smoothly. The inertial effect of a bale in the clamping apparatus assists the operator through the transition during the loading sequence; however, returning the loading arm to retrieve the next bale requires moving through the apogee position without the inertial assist of a bale.

In addition to managing operating of the bale loading actions, the operator must also operating the bale wagon itself, guiding it around the field to position bales on the ground within reach of the bale clamping apparatus and controlling movement of the bale tilting table that creates the stack of bales on the load floor. The result is that significant operational demands are placed on the bale wagon operator which lead to increased fatigue and ultimately affect productivity. It would be advantageous to provide a control system to automate portions of the Mil-Stak® bale loading cycle. Further advantages would be realized with a control system that operably coupled several portions of the loading cycle and provided a complete control system capable of automating the entire bale loading sequence up to and including preparation for bale load transport.

SUMMARY OF THE INVENTION

Accordingly, the present invention, in any of the embodiments described herein, may provide one or more of the following advantages:

It is an object of the present invention to provide a control system for a big bale loader on a bale wagon capable of controlling the loader arm and bale clamping apparatus throughout the entire loading cycle.

Another object of the present invention is to provide a position sensing mechanism for providing input to a control system for a big bale loader apparatus that will ascertain the position of the loading apparatus thereby enabling control of the apparatus regardless of the initial position of the apparatus.

It is another object of the present invention to provide a control system and position sensing mechanism for a big bale loading apparatus that will handle interruption of the automatic cycle without requiring the apparatus to be moved to a known initial position.

It is another object of the present invention to provide a sensing and control system for a big bale loading apparatus that monitors and limits bale clamping pressure to limit damage to the bales.

Yet another object of the present invention is to provide a sensing device in the bale clamping mechanism that can be used to initiate the bale clamping operation.

It is yet another object of the present invention to provide a control system for a bale loading apparatus that operationally couples discrete action initiation signals and corresponding actions into a unified, controlled operational cycle requiring minimal operator input.

It is yet another object of the present invention to provide a control system for a bale loading apparatus that operationally couples discrete action initiation signals for bale grasping and loader arm movement into a unified, controlled operational cycle requiring minimal operator input.

It is a still further object of the present invention to provide a sensing device for monitoring the position of the loading arm of a bale loading apparatus as the arm is raised from a fully lowered position and as the arm is lowered from a fully raised position.

It is a still further object of the present invention to provide a control system receiving position input from position sensing devices that is capable of controlling movement of the loading arm of a bale loading apparatus as is travels through an apogee in its travel path as the direction of motion of an actuator must be reversed.

It is a still further object of the present invention to provide a sensing and control system for a bale loading apparatus that is durable in construction, inexpensive of manufacture, carefree of maintenance, easily assembled, and simple and effective to use These and other objects are attained by providing a control system for managing rotation of a bale loading arm in a bale loader in which a pair of sensors combined with a purposefully designed sensor target enable loading arm position to be efficiently derived by a controller in order to direct the actuator movements based upon loading arm position necessary for automated operation of a bale loading cycle. Additional inputs to the controller enable initiation of a bale loading cycle to be automatically initiated. The controller may also determine when a complete bale wagon load is achieved and automatically direct loading arm motions necessary to configure the bale wagon for transport.

DESCRIPTION OF THE DRAWINGS

The advantages of this invention will be apparent upon consideration of the following detailed disclosure of the invention, especially when taken in conjunction with the accompanying drawings wherein:

FIG. 2 is a partial perspective view of the bale loading apparatus incorporating one embodiment of the present invention showing the loading apparatus in the fully lowered position;

FIG. 3 is a partial perspective view of the bale loading apparatus of FIG. 2 showing the apparatus in the fully raised position;

FIG. 4 is a partial section view of a portion of the bale load loading apparatus of FIG. 2 showing the position sensing system while the bale loading apparatus is in the fully lowered position;

FIG. 5 is a partial section view of the position sensing system shown in FIG. 4 while the bale loading apparatus is in an intermediate position at which point the mechanism is at top dead center, referred to as an intermediate transition position;

FIG. 6 is a partial section view of the position sensing system shown in FIG. 3 while the bale loading apparatus is in the fully raised position.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
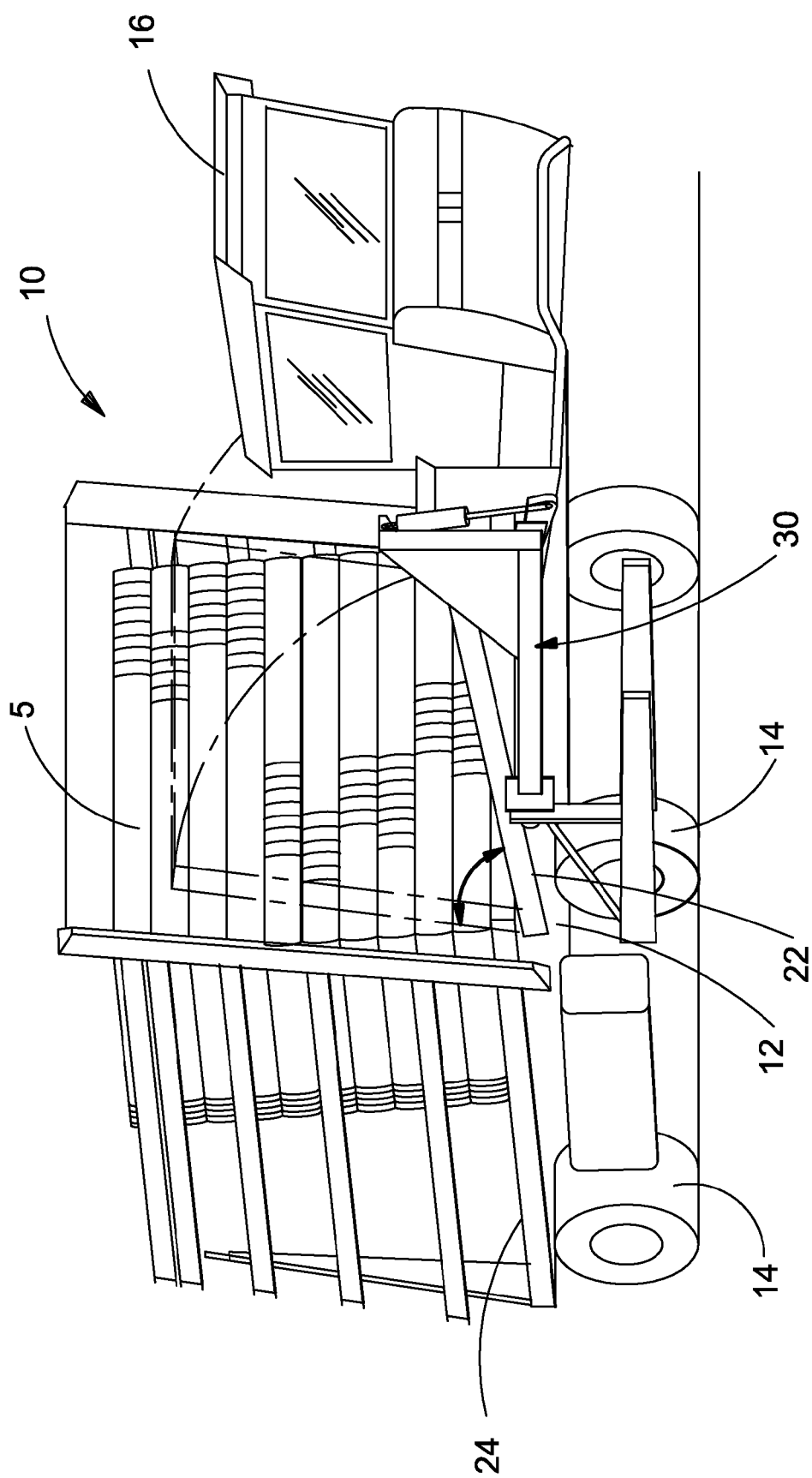
FIG. 1 is a front perspective of a bale wagon having a bale loader of the type on which the present invention is useful.
Figure 7:
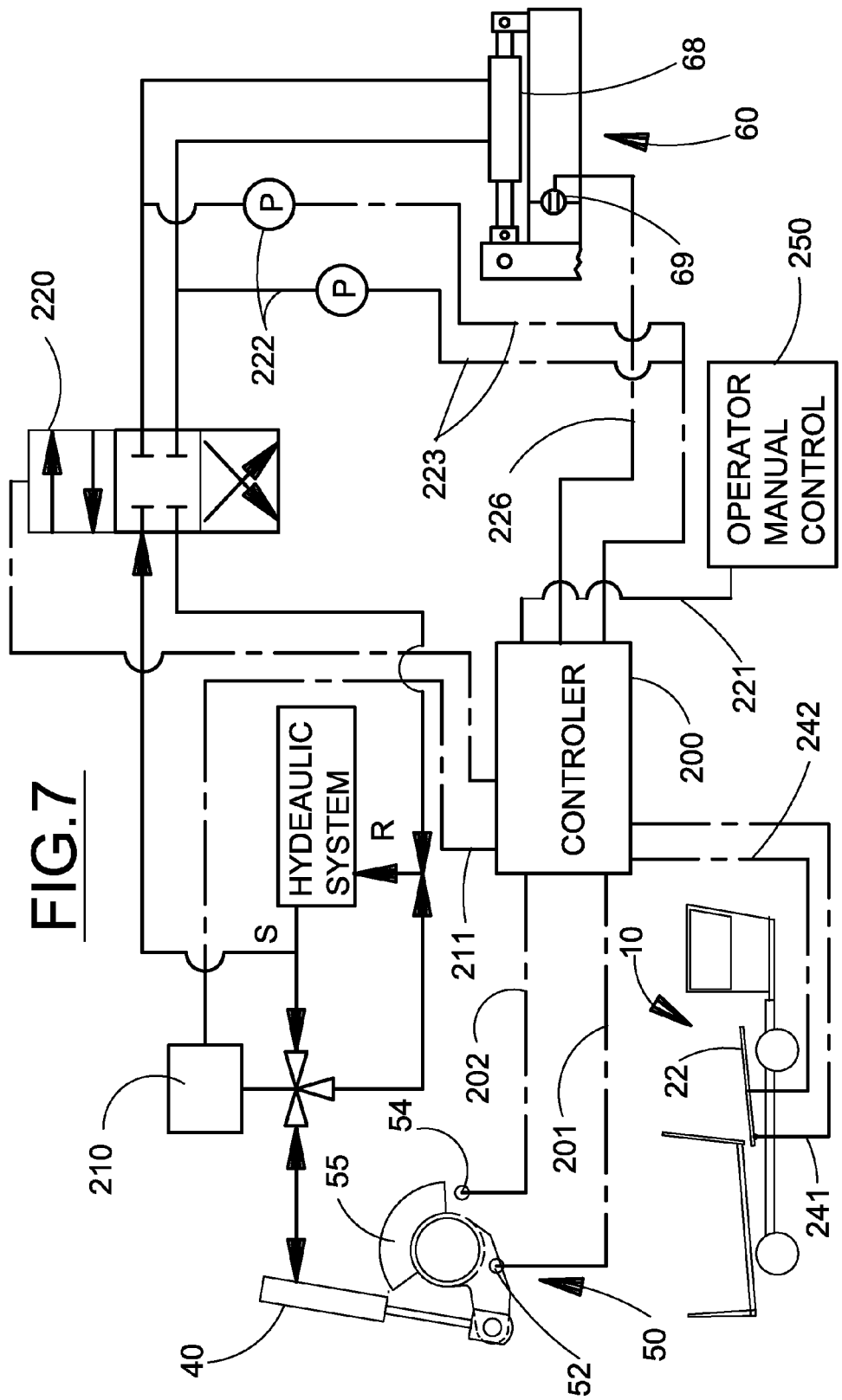
FIG. 7 is a simplified schematic of the control system embodying the present invention.

Referring now to the drawings and, particularly, to FIG. 1, a side view of a bale wagon incorporating the principles of the instant invention can be seen. The present invention is also useful on pull-behind bale wagons (bale wagons towed by a separate tractor or prime mover). Thus while the description herein is based upon application of the bale loader to a self-propelled wagon, the principles of the instant invention are equally useful on pull-behind bale wagons and should be construed as such. The bale wagon, generally designated 10, is provided with a mobile chassis generally designated 12 having wheels 14 and an operator cab 16. The cab 16 also includes the various controls both for the operation of the bale wagon as a vehicle and for the operation of the various bale loading and stacking portions of the machine. This bale wagon is of the self-propelled type; however, the primary source of power and some of the drive mechanism have been removed to simplify the drawing for purposes of clarity. The bale wagon 10 has the ability to function as an off-highway agricultural vehicle capable of good maneuverability and low speed for picking up ales, yet transport over the road from field to field.

The bale wagon 10 is generally described as a three-table bale wagon and is normally provided with a bale loader adapted to pick small bales up successively from the field and deposit them on a first table (not shown), also referred to as a cross-conveyor, for arrangement in a tier. As adapted in the present invention, bale loader 30 is configured to pick big bales 5 up successively and place them on a second or tilting table 22 where they are arranged prior to loading onto a third table, referred to as the load rack 24. The first table is not utilized when big bales are being loaded as a single big bale 5 (approximately 8 feet in length) typically spans the transverse width of the bale wagon. Bale loader 30, to be described in further detail below, is mounted to the forward portion of chassis 12, behind cab 16. Bales on the tilting table 22 are moved onto the load rack 24 by a pivoting movement of the tilting table (illustrated in FIG. 1). One, two, or three big bales (depending on the desired stack configuration) are typically simultaneously moved from the tilting table to the load rack resulting in one or two bales stacked upon the other when positioned on the load rack. When a sufficient quantity of bales is present in the load rack, the bale wagon is used to transport the bales to a location where the bales are to be stacked. The load rack 24 is pivotally connected to the chassis allowing it to be tilted to a near-vertical orientation, allowing the bales therein to be placed in a stack on the ground. Bale wagons of this type are generally well known in the art. Additional descriptive details of the bale wagon are provided in U.S. Pat. No. 2,848,127 issued to Grey, and U.S. Pat. No. 4,203,695, issued to Wynn, et al., the descriptive portions of which are incorporated herein by reference.

Referring now to FIGS. 1 through 3, bales are moved from the ground to the tilting table 22 by the bale loader, generally indicated by reference number 30. Bale loader 30 is mounted to chassis 12 and includes a pivoting bale loading arm 32 coupled to an elongate shaft 31, the shaft 31 having opposing first and second ends. Shaft 31 is rotationally supported by chassis 12 in a conventional manner using bearings, bushings or other known means for radially and axially supporting a rotating shaft. Bale loading arm 32 is connected to a first end of shaft 31 and extends radially therefrom to a pickup end 33. The connection between shaft 31 and bale loading arm 32 is configured to prevent relative movement therebetween such that bale loading arm 32 will be pivoted about axis 100 as shaft 31 rotates. Shaft 31 is oriented such that its rotational axis 100 is angled relative to the longitudinal axis 110 of the bale wagon, typically near 45 degrees, in order to provide proper bale positioning, retrieving bales from the field forwardly and outwardly and placing them on the tilting table rearwardly and inwardly by motion of the bale loading arm 32. A lever arm 36 is connected to the second end of shaft 31 and configured to extend radially therefrom creating a moment arm on which actuator 40 can act to rotate the shaft 31. In the embodiment presented, actuator 40 is a single-acting hydraulic cylinder which creates the need to reverse the direction of movement of the cylinder rod as the loading arm passes through the apogee position.

Bale pickup is accomplished using a bale grasping mechanism 60 which is connected to the pickup end 33 of the bale loading arm 32. Grasping mechanism 60 comprises a base frame 61 to which are connected a pair of spaced-apart grasping arms 62, each arm being movably connected to the base frame to allow selective clamping of a bale therebetween. In operation, grasping arms 62 are initially positioned generally parallel to the ground and oriented generally parallel to the direction of travel of the bale wagon. The operator steers the bale wagon until the bale to be loaded is aligned in the space between the grasping arms 62. As the bale wagon moves forward, the grasping arms 62 are positioned alongside the bale until an end of the bale contacts bumper 65. Bumper 65 typically includes springs or similar means to lessen the impact forces of the bale contact with the base frame. Bumper 65 may also include a contact switch to provide a control input to initiate a bale loading cycle, described in greater detail hereinafter. Grasping arms 62 are then moved towards one another to grasp the bale for lifting.

The range of motion of the bale loading arm 32 is approximately 180 degrees about the arm pivoting axis 100. The range of motion may be limited by positive travel stops, shown in FIGS. 4 though 6, as lower travel stop 36 and raise travel stop 37. The travel stops are shown adjacent to the actuator end of shaft 31, but may be positioned to interact with rotation of the bale loading arm 32 or other movable portion of the bale loader with equivalent functionality. For reference purposes herein, a zero rotational position reference is established when the bale loading arm is in the fully lowered position, as it would be when retrieving a bale from the field (the position shown in FIGS. 1 and 2). As the bale loading arm is raised, such as when picking up a bale from the field, it approaches a zenith position after approximately 120 degrees of rotation. Actuator 40 receives pressurized fluid for movement which elevates the bale grasping mechanism 60 (movement from 0 toward 120 degrees or from 180 degrees toward 120 degrees). At the zenith position, actuator 40 has reached a travel limit and its direction of travel must be reversed in order to continue rotation of the bale loading arm, thus this position is also referred to herein as the intermediate transition position. Motion which de-elevates the bale grasping mechanism 60 requires release of hydraulic fluid from actuator 40 (movement from 120 toward 180 degrees or from 120 degrees toward 0 degrees). Further rotation of the bale loading arm is necessary to position the bale on the tilting table 22. The bale loading arm is considered to be in the fully raised position when the bale is placed on the tilting table, requiring approximately 180 degrees of rotation from the fully lowered position.

Now referring to FIGS. 4 through 7, monitoring of the position of the bale loading arm is accomplished by a position sensing system 50 which comprises a first sensor 52, also referred to as the raise sensor, a second sensor 54, also referred to as a lower sensor, and a target 55 with a raising edge 56 and a lowering edge 57, each edge being generally defined by a radius extending from axis 100, span about 120 degrees of rotation of the shaft relative to a fixed point. Target 55 is configured to rotate in unison with shaft 31 while the first and second sensors remain in a fixed position. As the shaft and target rotate, the target will be sensed by neither, one, or both of the sensors. The raise and lower sensors 52, 54 are positioned approximately 92 degrees apart in the rotational plane of the target 55. Mounting slots 59 allow the position of raise and lower sensors 52, 54 to be adjusted to fine-tune operation of the bale loader control system. Position sensing system 50 provides input signals 201, 202 to a bale loading controller 200 enabling the position and direction of motion of the bale loading arm 32 to be determined. The sensors 52, 54 are configured to produce a binary output signal (input signals 201, 202); each sensor input signal to the controller has a first value (high) if the sensor detects the presence of the target in its sensing view and a second value (low) when the presence of the target is not detected. As the raising edge 56 and/or lowering edge 57 pass through the sensing view for each sensor, the output signal of the sensor will change states. It is the change in state that enables controller 200 to determine the rotational position of the shaft 31 and thus the bale loading arm 32. By comparing the order in which each sensor signal changes states, the position and direction of movement of the bale loading arm can be determined by the controller. As it is the change of state of the sensors that is used for input to the controller, one skilled in the art will recognize that the target and sensors can be re-oriented to reverse the target profile and/or the binary value of the output signals without departing from the intent of the present invention.

For reference, the bale loading arm in the fully lowered position as shown in FIG. 4 is established as 0 degrees and clockwise rotation as shown in FIGS. 4 through 6 is the positive direction. In the fully lowered position, the bale loading arm 32 is extended away from the bale wagon as it would be positioned to grasp a bale in a field to initiate a bale loading sequence. At or near the fully lowered position, neither the raise nor lower sensors 52, 54 can sense the target 55. Once initiated, actuator 40 is pressurized to begin moving lever arm 36 to rotate shaft 31 in a clockwise direction which corresponds to moving the bale loading arm 32 from the fully lowered position towards the raised position.

As the shaft 31 rotates, the raising edge 56 of target 55 first covers the lower sensor 54, positioned at approximately 14 degrees. A first signal 202 generated by the lower sensor when the raising edge 56 first encounters can be used to signal controller 200 that the bale loading arm 32 is moving in the raising direction.

After approximately 92 degrees of continued rotation of the bale loading arm, raising edge 56 will cover the raise sensor 52 and the bale loading arm will be positioned at approximately 106 degrees (approaching top dead center of the rotation). Since the target 55 spans approximately 120 degrees, the target will be in view of both the raise and lower sensors 52, 54. A second signal 201 generated by the raise sensor 52 combined with the first signal 202 from the lower sensor 54 can be used to signal the controller 200 that the bale loading arm is approaching its apogee (top dead center) and that the direction of travel of actuator 40 must be reversed in order to continue the bale loading motion. Controller 200 manages actuator 40 using actuator control valve 210, the position of which is controlled by actuator signal 211.

When the bale loading arm continues rotation and reaches a position approximately 134 degrees from the fully lowered position, the lowering edge 57 passes the lower sensor 64 so that only the raising sensor 62 views target 55 and first signal 202 changes state. At this point, the bale in the grasping mechanism 60 is approaching the tilting table 22. The change in the lower sensor 54 state while the raise sensor 52 is still sensing the target can be used by the controller 200 to initiate release timing of the bale grasping apparatus 60 so that the bale may be released and deposited on the tilting table as it reaches the tilting table surface. The raise sensor 52 continues to sense the target 55 as the bale loading arm moves to the fully raised position, 180 degrees from the fully lowered position.

As the rotation of the bale loading arm is reversed, the target 55 remains in view of raise sensor 52. Once the loading arm reaches a position at approximately 134 degrees, approaching the apogee in the lowering direction, lowering edge 57 passes over lower sensor 54 so that target 55 is in view of both sensors. As in the raising process, the presence of first and second signals 202, 201, respectively, indicates that the direction of travel of actuator 40 will soon need to be reversed.

Further rotation of the loading arm in the lowering direction results in the raising edge 56 of the target passing the raise sensor 52 as the loading arm reaches a position of approximately 106 degrees, just past the top dead center (zenith) position. This position is useful when the bale wagon 10 has been completely filled with bales 5 and is being prepared for transport. The normal transport position is with the tilting table 22 in the raised position against the bales in the load rack 24 and the bale loader 30 in the fully raised position. In order to reposition the tilting table 22, the bale loader 30 must be at least partially lowered in order to clear the tilting table 22. Rather than delay preparation for transport while the bale loader arm 32 travels from the fully raised position (where it would be having loaded the final bale for the load) to the fully lowered position to clear the tilting table and then return to the fully raised position for transport, an intermediate position that allows tilting table 22 movement without requiring the bale loader to travel to the fully lowered position saves time while the bale wagon is properly configured for transport.

As the bale loading arm 32 approaches the fully lowered position, the raising edge 56 will finally pass over the lower sensor 54 so that neither sensor views the target 55. At this point, time-based lowering of the lifting arm is allowed to continue until the lifting arm returns to the fully lowered position. When the lifting arm returns to the fully lowered position, the bale loading process is complete and the bale loader 30 is ready to pick up the next bale.

The control system comprises controller 200 which manages the bale loading process and enables automated loading of a bale. Controller 200 is programmed and configured to receive inputs signals, perform computational operations based on those input signals, and generate output signals for directing movement of actuators in the bale loader 30 and the bale wagon 10. The controller may be a separate unit dedicated to managing operation of the bale loader 30 or its function may be integrated into a controller tasked to manage the entire operation of the bale wagon. Controller 200 receives first and second input signals 201, 202 from raise and lower sensors 52, 54, respectively, indicating whether the target is in view of each sensor. From the sensor information, the controller 200 can determine the position of the bale lifting arm 32 within certain ranges and generate appropriate output signals 211, 221 to the lifting actuator 40 control valve 210 or the grasping actuator 68 control valve 220, respectively. Position indication signals at 106 and 134 degrees along with inputs from sequential actions enable the controller 200 to initiate control output signals to actuator control valve 210 so that changes in actuator 40 movement necessary to move the bale loading arm through the intermediate transition position may be managed. Additionally, the controller is configured to monitor the position of the bale lifting arm, even when the bale loader is being manually operated, so that the controller can resume automatic control with the lifting arm in any position without having to reposition the lifting arm to a known control initialization position. This allows control to be easily be moved between manual and automatic modes.

The bale loading process may be manually initiated through an operator input apparatus 250, initiated upon sensing that a bale has been properly grasped in the grasping apparatus by a pressure sensor 222 monitoring grasping actuator 68 pressure and generating grasping input signal 223, or the process may be automatically initiated upon sensing the presence of a bale within the grasping apparatus 60 by using a contact sensor 69 incorporated into the grasping apparatus to initiate the bale grasping operation by contact signal 226 followed by the bale loading operation.

Controller 200 may also include a counting function to monitor the number of bale loading cycles completed. The counter is needed to coordinate operation of the tilting table 22, which requires a full or partial tilting movement with each bale placement on the table 22. With an input for the bale capacity of the bale wagon (dependent upon the desired bale stack configuration), either built into the controller function or selectively input by an operator using the operator input apparatus 250, the controller 200 can determine when the maximum load of the bale wagon has been reached and, using the position function that enables a partial lowering of the bale lifting arm described above, coordinate movement of the bale lifting arm to an intermediate position at which the tilting table 22 can be repositioned for transport and then direct the bale lifting arm 32 to return to the fully raised position for transport. Tilt table position is determined by well known means resulting in a tilt table position signal 241 which is provided to controller 200. Controller 200 the operationally coordinates movement of the tilting table 22 with the bale loader 30 by providing the tilt table position signal 242 which directs movement of the tilt table, generally by directing movement of the tilt table hydraulic actuators similar to the methods discussed above with respect to the bale loading arm actuator control.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A control system for managing movement of a bale loading apparatus on an agricultural bale wagon through a bale loading cycle, the loading apparatus having a bale lifting arm connected at one end to a rotatable shaft and having a bale grasping mechanism connected to an opposing end of the lifting arm, the bale lifting arm angularly rotatable about an axis in a generally vertical plane between opposing first and second angular positions and having an intermediate transition angular position disposed therebetween, the grasping mechanism having a grasping position and a release position, the control system comprising:

an actuator for moving the lifting arm between the first and second angular positions, said first actuator movable in opposing first and second directions, movement of said actuator in said first direction causing movement of the lifting arm toward the intermediate transition angular position, movement of said actuator in said second direction causing movement of the lifting arm away from said intermediate transition angular position;

a target connected to the shaft for rotation in unison therewith;

a first position sensor for detecting the rotational proximity of said target and initiating a first position signal, said first position signal having a binary first or second value, said first value occurring when said target is detected;

a second position sensor angularly spaced apart in the plane of rotation from said first position sensor for detecting the rotational proximity of said target and initiating a second position signal, said second position signal having a binary first or second value, said first value occurring when said target is detected;

a first actuator reversal position angularly disposed between the first lifting arm position and the intermediate transitional position;

a second actuator reversal position angularly disposed between the second lifting arm position and the intermediate transitional position; and a controller programmed and configured to receive said first and second position signals and generates an actuator reversal output signal that causes the direction of movement of said actuator to be reversed when said first and said second signal values change from said first or said second position sensor detecting said target to said first and said second position sensor detecting said target thereby enabling movement of the bale lifting arm to continue in the same direction through the intermediate transition position, whereby said first and second position sensors are located relative to said target such that initiation of said actuator reversal output signal occurs in a time sufficient for said actuator movement direction to be reversed and enable uninterrupted rotation of the bale lifting arm through the intermediate transition position.

2. The control system as described in claim 1, wherein said first actuator reversal position occurs as when the bale lifting arm is moving from the first position toward the second position, said second position sensor output signal is said first value, and said first position sensor changes from said second value to said first value; said second actuator reversal position occurs when the bale lifting arm is moving from the second position toward the first position, said first position sensor output signal is said first value, and said second position sensor output signal changes from said second value to said first value.

3. The control system as described in claim 2, wherein said first and second position sensors are angularly adjustable about the shaft whereby said first and second actuator reversal positions may be varied.

4. The control system as described in claim 2, wherein said target configured to span a predetermined rotational sector of the shaft rotation, said rotational sector being bounded on said target by a raising edge and a lowering edge, rotational movement of said target causing said first and second output signals to have said first value for a predetermined rotational displacement, whereby said controller determines the rotational angular position and the direction of rotation of the bale lifting arm from said first and second position sensor output signal values and the sequence of changes in state of said first and second position sensor output signal values.

5. The control system of claim 4, further comprising a grasp sensing device configured to initiate a grasp signal indicating the presence of a bale in the grasping mechanism while in the grasping position, wherein said controller, upon receipt of said grasp signal following said initiation signal, initiates the bale loading cycle.

6. The control system of claim 5, further comprising a contact sensor for generating an initial signal when a bale is positioned for grasping in the grasping mechanism, said controller upon receipt of said initial signal generates a signal that initiates movement of the bale grasping mechanism from the released position to the grasping position.

7. The control system of claim 5, further comprising an operator input apparatus configured to generate an initiation signal to signal said controller to commence a bale loading cycle.

8. A control system for managing operation of a bale loading apparatus on an agricultural bale wagon, the loading apparatus having a bale lifting arm connected at one end to a rotatable shaft and having a bale grasping mechanism connected to an opposing end of the lifting arm, the bale lifting arm rotatable about an axis in a generally vertical plane between opposing first and second positions and having an intermediate transition position disposed therebetween, the grasping mechanism having a grasping position and a release position, the control system comprising:

an input device for generating an initiation signal to commence a bale loading cycle by the bale loading apparatus;

a position monitoring system further comprising:
a target structure connected to the shaft for rotation in unison therewith, said target structure configured to be intermittently detectable by a first position sensor and a second position sensor dependent upon the rotational position of said target structure;
said first position sensor for detecting the presence of said target structure and producing a binary first position signal, said first position signal having a first value when said target is detected and a second value when said target is not detected; and
said second position sensor for detecting the presence of said target structure and producing a binary second position signal, said second position signal having said first value when said target is detected and said second value when said target is not detected;

a first actuator for moving the lifting arm between the first and second positions, said first actuator movable in opposing first and second directions, movement of said actuator in said first direction causing movement of the lifting arm toward the intermediate transition position, movement of said actuator in said second direction causing movement of the lifting arm away from said intermediate transition position; and a controller programmed and configured to receive said position signals from said first position sensor and said second position sensor representing the changing position of said target structure relative to said first and second position sensors and to activate said actuator, wherein said controller, upon receiving said first position signal having said first value and said second position signal having said first value initiates a first actuator signal causing the direction of movement of said actuator to be reversed.

9. The control system as described in claim 8, wherein said target structure is configured to cause said first and second position signals to have said first value for a range of rotational movement in either direction around the intermediate transition position.

10. The control system of claim 9, further comprising a grasp sensing device configured to initiate a grasp signal indicating the presence of a bale in the grasping mechanism while in the grasping position, wherein said controller, upon receipt of said grasp signal, initiates the bale loading cycle.

11. The control system of claim 10, further comprising an operator input apparatus configured to generate an initiation signal to signal said controller to initiate a signal to reposition said grasping mechanism from said released position to said grasped position.

12. The control system of claim 10, further comprising a contact sensor for generating an initial signal when a bale is positioned for grasping in the grasping mechanism, said controller upon receipt of said initial signal generates a signal that initiates movement of the bale grasping mechanism from the released position to the grasping position.

13. A method for automatically controlling the motion of a bale lifting arm in a bale loader on an agricultural bale wagon comprising the steps:
providing a bale lifting arm connected at one end to a rotatable shaft, the bale lifting arm angularly rotatable about an axis in a generally vertical plane between opposing first and second angular positions and having an intermediate transition angular position disposed therebetween;
providing an actuator for moving the lifting arm between the first and second angular positions, the first actuator movable in opposing first and second directions, movement of the actuator in said first direction causing movement of the lifting arm toward the intermediate transition angular position, movement of said actuator in the second direction causing movement of the lifting arm away from the intermediate transition angular position;
providing a target connected to the shaft for rotation in unison therewith, the target configured to be intermittently detectable by at least one position sensor to define a first reverse signal position and a second reverse signal position, the first reverse signal position corresponding to a lifting arm position between the first position and the intermediate transition position, the second reverse signal position corresponding to a lifting arm position between the second position and the intermediate transition position;
providing a first position sensor for detecting the presence of the target and producing a binary first position signal, the first position signal having a first value when the target is detected and a second value when the target is not detected;
providing a second position sensor for detecting the presence of the target and producing a binary second position signal, the second position signal having the first value when the target is detected and the second value when the target is not detected;
providing a bale grasping apparatus connected to an end of the bale lifting arm opposite the rotatable shaft, the grasping mechanism having a grasping position and a release position, movement between the positions managed by grasp signals initiated by the controller;
providing a grasp sensing device configured to initiate a grasp signal indicating the presence of a bale in the grasping mechanism while in the grasping position;
providing a controller programmed and configured to receive the first and second position signals representing the changing position of said target structure relative to the first and second position sensors and to activate the actuator, the controller further programmed and configured to receive the grasp signal and initially activate actuator to commence a bale loading cycle, the controller further programmed and configured to activate a grasping mechanism actuator for movement between grasped and released positions;
providing an operator input apparatus configured to selectively generate an initiation signal to signal the controller to commence a bale loading cycle and generate manual control signals to manually position the lifting arm;
propelling the bale wagon to a first bale;
manually positioning the lifting arm in the first position with the grasping mechanism in the released position;
propelling the bale wagon to position the first bale in the grasping apparatus;
initiating a bale loading cycle using the operator input apparatus to generate an initiation signal to the controller;
repositioning by the grasping mechanism from the released position to the grasped position responsive to the controller;
sensing by the grasp sensing device that a bale is restrained in the grasping apparatus and initiating a grasp signal for receipt by the controller;
generating by the controller of a raise signal to move the actuator in the first direction thereby moving the lifting arm from the first position toward the intermediate transition position;
confirming by the controller of raising movement lifting arm movement when the second position sensor signal value changes from the second value to the first value;
initiating an actuator reversal signal by the controller when the first position sensor signal value changes from the second value to the first value;
receiving of the actuator reversal signal by the actuator as lifting arm reaches the intermediate transition position thereby causing the actuator to reverse direction of movement from the first direction to the second direction;
confirming by the controller of lifting arm movement from the intermediate transition position toward the second position when the second position sensor signal value changes from the first value to the second value;
signaling by the controller to the grasping mechanism when the lifting arm reaches the second position to reposition the grasping mechanism from the grasped position to the released position thereby releasing the bale on the bale wagon;
generation by the controller of a lowering signal to move the actuator in the first direction thereby moving the lifting arm from the second position toward the intermediate transition position;
initiating an actuator reversal signal by the controller when the second position sensor signal value changes from the second value to the first value;
receiving of the actuator reversal signal by the actuator as lifting arm reaches the intermediate transition position thereby causing the actuator to reverse direction of movement from the first direction to the second direction;

confirming by the controller of lowering lifting arm movement from the intermediate transition position toward the first position when the first position sensor signal value changes from the first value to the second value;

confirming by the controller of lowering lifting arm movement from the intermediate transition position toward the first position when the second position sensor signal value changes from the first value to the second value; and the lifting arm reaches the first position whereupon the bale loader is configured to load a next bale.

14. The method as described in claim 13, further comprising the steps:

providing a bale tilting table on the bale wagon having a raised and a lowered position, positioning of the tilting table responsive to a tilt actuator activated by the controller, the tile table disposed on the bale wagon such that the lifting arm, when positioned between the intermediate transition position and the second position, prevents tilting of the tilting table;

programming and configuring the controller to monitor and direct tilting of the tilting table;

providing a bale counting function in the controller to count the number of bale loading cycles;

inputting a maximum number of bales to be loaded on the bale wagon into the controller using the operator input apparatus;

operating the bale wagon to load bales until the number of bale loading cycles equals the maximum number of bales minus one;

interrupting the bale loading cycle by the controller to pause movement of the actuator as the lifting arm passes the intermediate transition position in the lowering direction and the first position sensor signal value changes from the first value to the second value;

generation by the controller of a tilt signal to raise the tile table;

sensing by the controller that the tilt table has reached the raised position;

generation by the controller of the raise signal to move the actuator in the first direction thereby moving the lifting arm toward the intermediate transition position;

initiating an actuator reversal signal by the controller when the second position sensor signal value changes from the second value to the first value;

receiving of the actuator reversal signal by the actuator as lifting arm reaches the intermediate transition position thereby causing the actuator to reverse direction of movement from the first direction to the second direction;

confirming by the controller of lifting arm movement from the intermediate transition position toward the second position when the second position sensor signal value changes from the first value to the second value; and signaling by the controller to halt the lifting arm in the second position whereupon the bale wagon is ready for transport.

15. The method as described in claim 14, further comprising the steps:

providing a contact sensor for generating an initial signal when a bale is positioned for grasping in the grasping mechanism; and receiving by the controller of the initial signal and generating a signal that initiates movement of the bale grasping mechanism from the released position to the grasping position.

16. The method as described in claim 15, further comprising the steps:

providing a manual control mode of operation in the controller selectable by an operator using the operator input device, wherein the operator manually manages movement of the lifting arm using the operator input device;

selecting, by the operator, of the manual control mode of operation;

directing, by the operator, signals to cause a desired manual movement of the actuator and/or grasping mechanism;

monitoring, by the controller, of the position and direction of movement of at least the lifting arm and grasping mechanism while in manual control mode; and selecting, by the operator, of the automatic control mode whereupon the controller resumes automatic control of the bale loader from the position and direction of motion of the lifting arm at the time automatic control is resumed.

* * * * *